Dec. 4, 1962 J. A. AILEO 3,066,305
EYE SHIELD SUPPORTING AND DETENT MEANS FOR HELMET
Filed Aug. 20, 1959 3 Sheets-Sheet 1
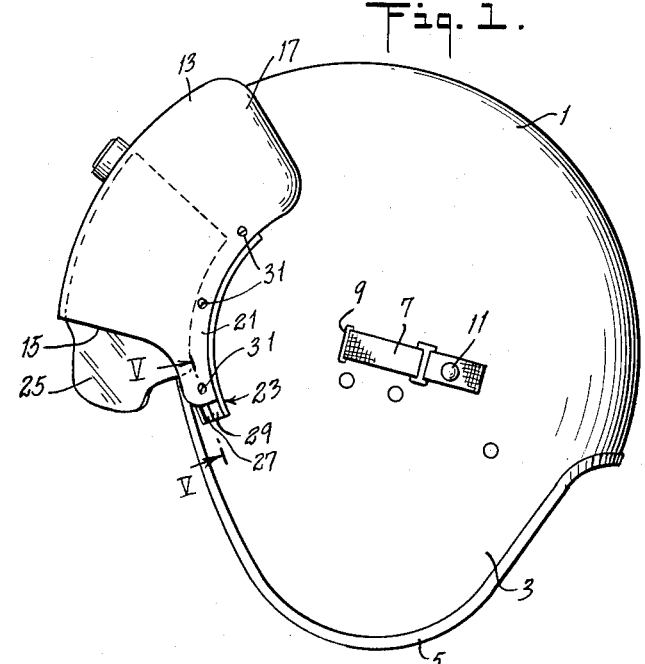
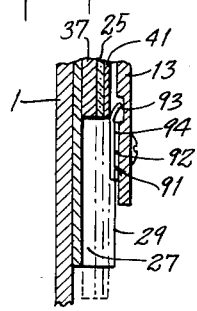
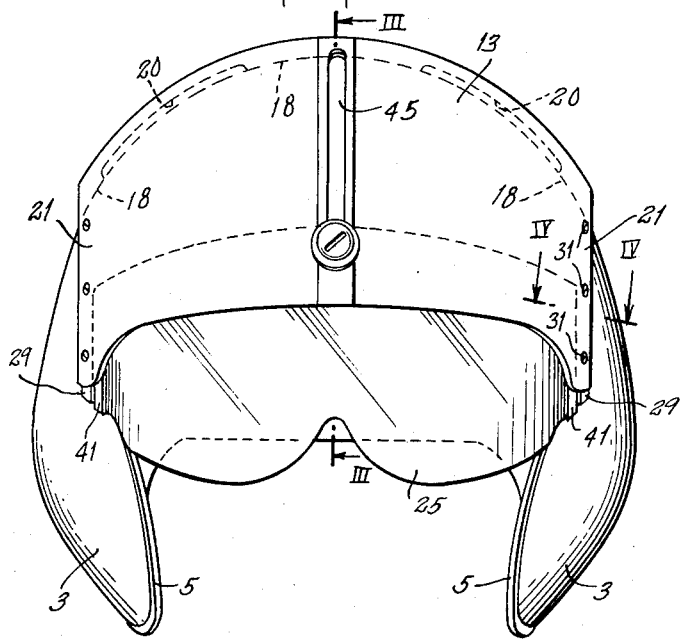
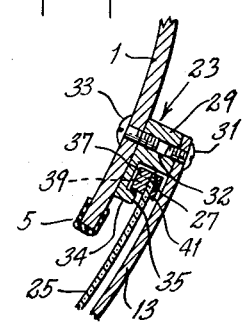
INVENTOR.
JACKSON. A. AILEO
BY Lester W. Clark
ATTORNEY Dec. 4, 1962 — J. A. AILEO — 3,066,305
EYE SHIELD SUPPORTING AND DETENT MEANS FOR HELMET
Filed Aug. 20, 1959 — 3 Sheets-Sheet 2
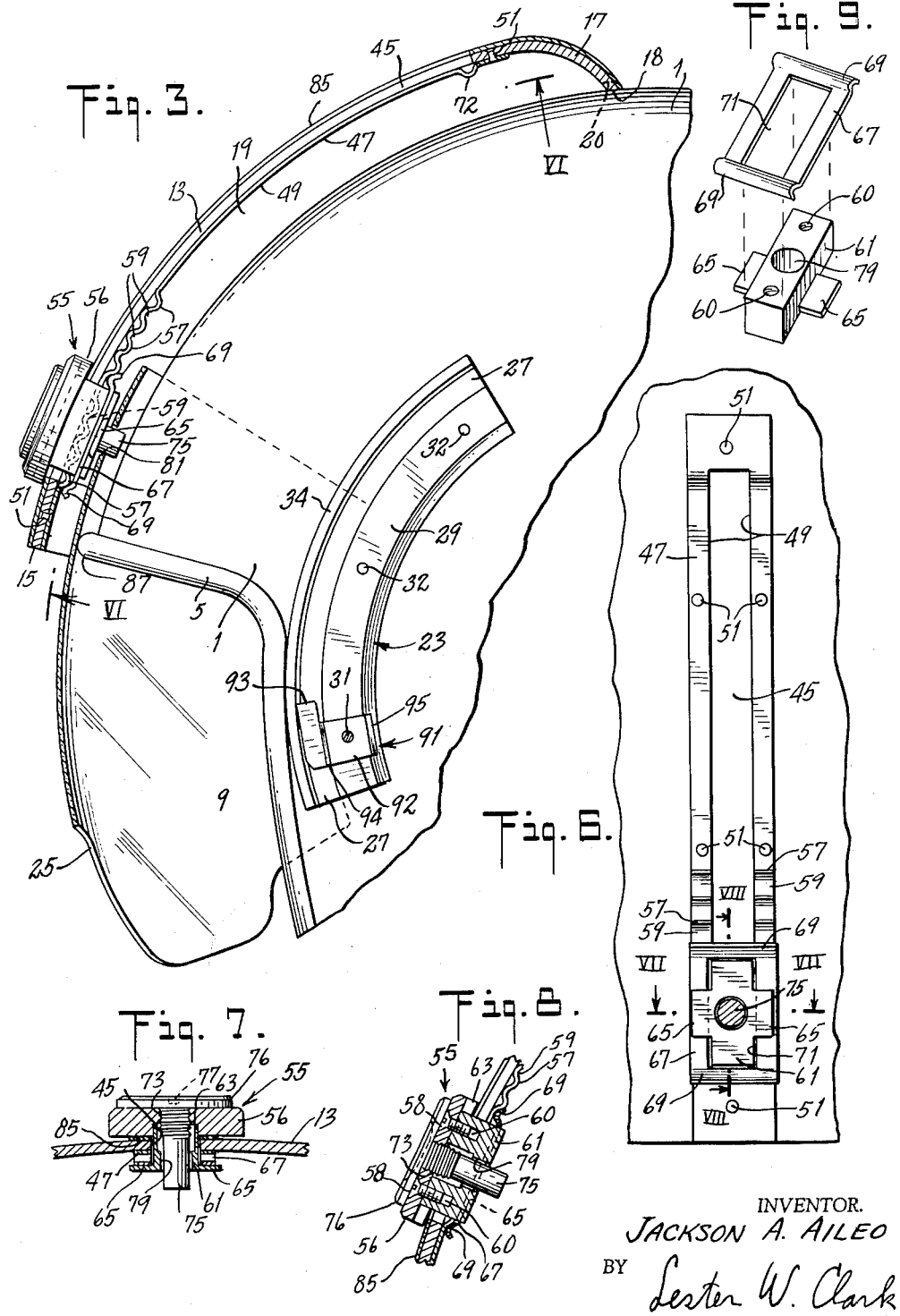
INVENTOR.
JACKSON A. AILEO
BY Lester W. Clark
ATTORNEY

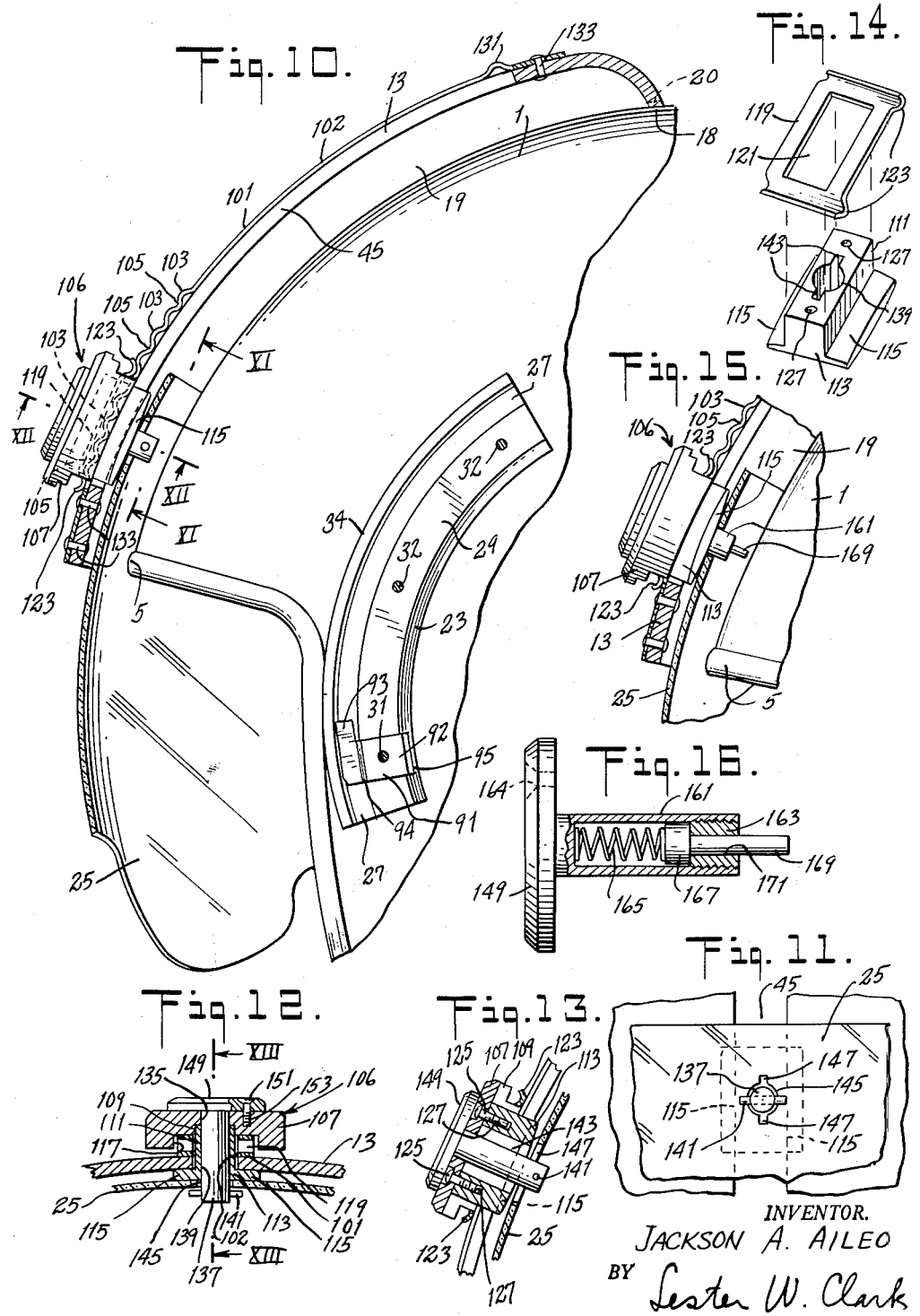

United States Patent Office 3,066,305
Patented Dec. 4, 1962

3,066,305
EYE SHIELD SUPPORTING AND DETENT MEANS FOR HELMET
Jackson A. Aileo, Carbondale, Pa., assignor to Leonard P. Frieder, Great Neck, Long Island, N.Y.
Filed Aug. 20, 1959, Ser. No. 835,120
15 Claims. (Cl. 2—6)

This invention relates to a protective helmet and more especially to a helmet provided with an eye-shielding visor. The invention particularly relates to a helmet having a visor movable to and from eye-shielding position and means for securely holding the visor in a desired position.

Helmets for protecting the head of the wearer have been proposed for use in an aeronautical and other industrial work where it is necessary or desirable also to shield the eyes from glare or direct sunlight or from other excessively brilliant or actinic rays. Various means for supporting the visor on a helmet in sliding relation to a trackway or other visor supporting means have been proposed, together with means for securing the visor in a predetermined position along the trackway. The expedients heretofore proposed for securing the visor in a desired position have included means requiring manipulation which in some cases interfered with the manual operations or movements on the part of the aeronaut or operator. These conditions prevented quickly adjusting the visor to a position relative to the eyes such that the activity of the operator could be carried on properly.

It is an object of the invention to provide a helmet of the type referred to in which the visor may be moved quickly to a desired position between the position thereof shielding the eyes and a retracted position.

It is another object of the invention to provide for holding the visor securely in a position to which it is moved so as to prevent accidental movement therefrom.

It is a further object of the invention to provide for securely holding the visor in a desired position while also providing for readily effecting movement of the visor to and from such position without additional manipulation of a securing device.

It is an additional object of the invention to provide in an aeronautical helmet for preventing undesirable displacement of the visor and of parts of the helmet associated with the visor relative to the shell under aerodynamic action.

It is a still further object of the invention to provide means for preventing flutter of the visor under aerodynamic action.

For accomplishing the objects of the invention a helmet having a rigid shell dimensioned to receive the head of the wearer is provided with a cover secured to the forward portion of the shell in outwardly spaced relation thereto to form a visor receiving space. The visor is carried upon the shell outwardly thereof and may be supported by track means for movement of the visor between a retracted position beneath the cover and a position shielding the eyes of the wearer. The cover is provided with a slot extending generally upwardly and rearwardly from the end thereof adjacent the lower edge of the cover, ordinarily adjacent the forward edge of the helmet above the eyes.

In order to effect movement of the visor into and out of the visor receiving space, a slider is supported by the cover for movement along the slot, this slider having a portion which extends through the slot into the visor receiving space and engages the visor for effecting the movement of the visor as the slider is moved along the slot. As will be more readily understood from the description of the drawings to follow, the slider and parts auxiliary thereto provide for readily effecting engagement thereof with and disengagement thereof from the visor in order to assemble and disassemble these members. The slider construction also is such as to cooperate with detent means for the desired secure holding of the visor in a selected position to which it has been moved.

In order to effect holding of the visor in the selected position, in accordance with the invention detent means is disposed adjacent the slot in the cover at a predetermined position or at several predetermined positions spaced along the slot. The slider carries detent engaging means for engaging the detent means to hold the slider in a predetermined or selected position relative to the cover. Having regard to the engagement of the slider with the visor, the visor thus may be held in the predetermined or selected position including the positions thereof in which the visor shields the eyes and the position thereof retracted from eye-shielding position.

In the device of the invention means are provided for effecting camming movement of the detent engaging means which is carried by the slider relative to the detent means which is disposed adjacent the slot. This camming action is effected when the slider is started along the slot from a position in which the detent engaging means is in engagement with the detent means. The detent engaging means, upon reaching any other predetermined or selected position, is moved into engagement with the detent means by a biasing means. Because of the form of the means providing for the camming action, a corresponding camming action takes place under the bias applied to the detent engaging means with respect to the detent means so as to reach the position in which these means are effective securely to hold the slider after the slider has been moved along the slot approximately to the desired or predetermined position.

It is another feature of the invention that the cover, which with the shell defines a visor receiving space, is formed so as to provide for releasing or venting air which may be forced into this space when, as in aviation, the helmet is worn by the aviator in an aircraft moving at high speed. Lifting of the cover with respect to the helmet or of the helmet as a whole relative to the head thus may be prevented or relieved because of equalizing sufficiently the pressure conditions within and outside of the cover receiving means.

The invention also utilizes track means of significant form which provides for readily mounting and demounting the visor and means for holding the visor with respect to the cover and the shell during the sliding movement of the visor between eye-shielding position and the retracted position thereof. The track means also affords a means for holding the cover in place in the requisite spaced relation to the visor and to the shell. Means associated with this track means also is provided for holding the visor against flutter, especially when the visor is in eye-shielding position.

These and other objects and features of the invention will be more clearly understood from the description to follow, taken in connection with the drawings in which:

FIG. 1 shows a side elevation of the helmet of the invention;

FIG. 2 shows a front elevation viewed from the left in FIG. 1;

FIG. 3 is a partial vertical section on line III—III of FIG. 2, showing the detent means disposed at the inner side of the cover;

FIG. 4 shows in section in a generally horizontal plane, as indicated at IV—IV in FIG. 2, the track means in association with the visor and cover;

FIG. 5 is a section on line V—V of FIG. 1 showing the flutter preventing means;

FIG. 6 shows a section taken on the arc VI—VI indicated in FIG. 3;

FIG. 7 is a section of the slider and parts carried thereby taken on line VII—VII of FIG. 6;

FIG. 8 is a section taken on line VIII—VIII of FIGS. 6 and 7;

FIG. 9 shows an exploded view of parts carried by the slider, including a detent engaging means;

FIG. 10 shows a partial vertical section of a modification of the helmet of FIG. 3 in which the detent means is mounted at the outer side of the cover;

FIG. 11 is an elevation, as at line XI—XI in FIG. 10, showing the under side of the visor engaged by parts carried by the slider;

FIG. 12 is a section of the slider and parts carried thereby taken on line XII—XII of FIG. 10;

FIG. 13 is a section on line XIII—XIII of FIG. 12;

FIG. 14 is an exploded view of parts carried by the slider of FIG. 10, including the detent engaging means;

FIG. 15 shows a modification of the slider of FIG. 10;

FIG. 16 shows to enlarged scale a detail of the slider of FIG. 15.

As shown in FIGS. 1, 2 and 3, the helmet provides a rigid shell 1 of generally hemispherical shape with ear covering portions 3 depending from the body portion thereof. Extending along the edge of the shell and the ear covering portions is an edge covering strip 5 which may be of rubber or plastic or other suitable material for protecting the wearer against contact with the edge of the shell. The shell may be provided with a suitable rigging extending over the head for disposing and supporting the shell in proper relation to the head for comfort and safety. For example, a rigging such as that shown in U.S. Patent No. 2,739,309, granted March 27, 1956 to Leonard P. Frieder and Walter S. Finken, may be used. These parts disposed within the shell constitute no part of the invention and are not shown in the drawing except that the strap 7 extending from within the helmet out through opening 9 for adjusting a headband to the head may be secured by means of a snap fastener 11 to the helmet at its outer surface.

Mounted exteriorly to the shell 1 is a cover 13 extending from its lower edge 15 upwardly generally parallel to the arc of the shell to an upper edge portion 17 which is reverted toward the outer surface of the shell 1. The edge surface 18 (see FIG. 2) of the edge portion 17 in the embodiment shown engages the outer surface of the shell 1 at the parts of the upper edge portion which are laterally disposed in the cover 13 as well as at a centrally disposed part of this upper edge portion. Between the parts of the upper edge portion 17 which provide the edge surfaces 18, the edge surface 20 of the upper edge portion 17 is spaced from the shell, as shown in dotted lines in FIGS. 2 and 3, to provide vent or relief openings through which air forced into the space 19 defined between the cover and the shell may pass outwardly from the space 19. When the helmet is exposed to air moving relative thereto at high speed, the pressure which may tend to build up within the space 19 thus is relieved and any tendency of the cover 13 to lift from the helmet is inhibited.

The cover 13 is made of such material and form as to provide rigidity to insure that the upper edge portions shall engage the shell as described and that the lateral edge portions 21 may be held securely in relation to the shell to hold the cover in place. Preferably the cover at its lateral edges is supported on two track means 23 of arcuate form which, as hereinafter described, support the visor 25 for movement thereof to and from the retracted position within the space 19. Each track means 23 provides a groove 27 which extends, as shown in FIGS. 1 and 3, generally along the circumference of a zone circle of the generally hemispherical shell 1. The two track means are provided at the opposite sides of the helmet and, as shown in FIG. 2, may lie in substantially vertical parallel planes.

Each track means 23 provides a body portion 29, FIGS. 3 and 4, extending along the arc of the track and of substantial width transversely of this arc to provide an outer surface for receiving the bearing of the under side of the cover 13 along the lateral edges thereof. The cover may be secured to the body portion 29 by screws 31, these screws being threaded in holes 32 which also receive at their under sides, screws 33 for securing the track means to the shell 1. Thus the lateral edges of the cover have support through the length thereof upon the broad surface of the body 29 and the top reverted portion 17 of the cover which is stiff by virtue of its form is held in good bearing relation to the shell so that the cover is rigidly supported on the shell with the lower end of the space 19 defined by the edge 15 open.

The track means 23 at the opposite side of the groove 27 from the body portion 29 is provided with a wall 34, FIG. 4, extending outwardly from the shell 1, the outer edge 35 of this wall being spaced from the inner surface of the cover 13 so as to provide space for the visor 25 to pass between the wall 34 and the cover 13 in the sliding movement of the visor along the track.

Each lateral edge of the visor 25 has a bead 37 extending along the edge and secured thereto, as by rivets 39. The bead 37 engages the facing surfaces of the body 29 and of the wall 34 and the bottom of the groove 27 for sliding movement of the bead along the groove concomitantly with movement of the visor 25 inwardly and outwardly of the space 19 to and from the retracted position within this space. Each lateral edge of the visor also is provided with a bearing or wear strip 41 at the face thereof disposed toward the cover 13 for sliding engagement with the cover in the movement of the visor along the track. When the cover 13 is secured by the screws 31 upon the body 29 of the track means, having regard to the dimensions of the bead 37 and of the wear strip 41 and to the proportions of the groove, the cover 13 becomes disposed in relation to the visor 25 so as to retain the bead 37 in the required sliding relation to the groove for the desired movement of the visor along the track means. The track means provided at both lateral edges of the cover serve to retain the visor in the proper relation to the shell and to the cover for shielding the eyes of the wearer when the visor is drawn down and for disposing the visor in the retracted position when moved from the eye-shielding position.

The cover 13 is provided with a central slot 45 extending upwardly from a point just above the lower margin of the cover to a point just below the upper margin. A slider 55 is manually movable along the slot and is connected to the visor 25 for moving it between its shielding and retracted positions. In the embodiment of FIG. 3, along the slot 45 in the cover 13 and at the inner surface of the cover is disposed a slotted strip 47 which includes a detent means. The strip 47 may be of metal or other suitable material having a slot 49 which is of the same size and aligned with the slot 45 in the cover. The strip 47 is secured by rivets 51 extending through the thickness of the cover and of the strip, a plurality of rivets being disposed along the strip 47 to securely hold it in place, conforming to the arcuate extent of the cover along the slot 45. The upper end of the strip 47 is secured by a rivet 51 adjacent the reverted portion 17 of the cover and the lower end of the strip 47 is secured adjacent the lower end of the cover at the opening into the space 19 provided between the cover 13 and the shell 1. As will be understood from further description the strip 47 serves for engagement of parts carried by the slider 55 in the movement of the slider along the slots 45 and 49 in the cover and strip.

At selected or predetermined locations along the strip 47 in the embodiment being described the detent means are provided. For this purpose the strip is crimped to form corrugations of generally sinusoidal contour which provide teeth 57 separated by depressions 59, the teeth being equally spaced along the strip. As will be noted from FIG. 3, two sets of such teeth are provided adjacent the lower end of the slot 45, each set having four teeth projecting into the space 19 from the inner surface of the cover 13 and forming the depressions therebetween. At the opposite ends of each set the slopes of the teeth join the flat surface of the strip in generally symmetrical relation in conformity with the intermediate teeth.

The slider 55, as shown in FIGS. 3 and 6 to 9, inclusive, comprises a head 56 which is secured by screws 58 (FIG. 8) countersunk in the head and threaded in holes 60 of a block 61 of slightly less width than the slots 45 and 49 in the cover 13 and strip 47. The block 61 is of rectangular form and extends upwardly through the slots and is fitted in a rectangular recess 63 cut in the under side of the head 56.

The block 61 also is provided with lateral flanges 65 at either side thereof between which and the strip 47 a detent engaging means in the form of a spring element 67 is disposed. This spring element is provided at its ends (see FIG. 9) with prominences or teeth 69 of similar form to the teeth 57 of the strip 47. The element 67 is provided with a rectangular opening 71 slightly larger than the rectangle of the block 61, so that movement of the spring element relative to the block easily may take place and this element readily may be put in place and removed from the block in assembling and dismounting. Having regard to the thickness of the cover 13 and the strip 47, the dimensions of the block between the flanges 65 and the outer surface thereof adjacent the outer surface of the cover may be sufficient to provide for such mounting of the element 67 and for movement of the teeth 69 thereof in camming relation to the teeth 57 of the strip 47 so that, when the slider 55 is pushed lengthwise of the slot in either direction, such camming action takes place concomitantly with movement of the teeth 69 out of the depressions 59 and over the top of the teeth 57 into the next depression 59 between the teeth 57. In this movement the teeth 69 of the spring element, under the bias of the spring action, are cammed into the respective depressions, the length of the spring element between its two teeth 69 being the same as the distance between the corresponding depressions 59 in the two sets of teeth, as shown in FIG. 3.

The spring element 67 is of such resilient strength as to hold the teeth 69 in the depressions 59 to resist the camming action and movement of the slider from a position in which it is set. The strength of the spring, however, is such that the slider may be pushed by hand in either direction along the slot to overcome the bias of the spring element concomitantly with the camming action described.

In the embodiment being described, the spring element 67 is shown in FIGS. 3 and 8 with its lower tooth 69 in engagement with the downwardly disposed sloping surface of the lowermost tooth 57 of the lower set of teeth 57, the upper tooth 69 of the spring element being in engagement with the downwardly disposed sloping surface of the lowermost tooth of the upper set of teeth 57. Thus, the spring element is in a position in which upward movement thereof is resisted because of the biased camming action of the spring element 67 with respect to the teeth 57. This disposition is provided, as will be noted in FIG. 3, when the end of the block 61 is substantially in abutment against the cover 13 at the lower end of the slot 45. Movement of the slider in either direction upwardly or downwardly from its lowermost position thus is resisted. It also will be apparent that when the teeth 69 of the element 67 both are in engagement with corresponding depressions 59 in the two sets at any of the other three positions upwardly disposed with respect to the position shown in FIG. 3, such movement in either direction away from one of these other three positions also is resisted because of the camming relation of the teeth, so that the slider is securely held against such movement and the visor also is held against upward or downward movement along the slot 45. It will be understood that these four positions provide for accommodating the position of the visor to different oxygen masks adjacent to which the lower edge of the visor may become disposed when the visor is in eye-shielding position.

When it is desired to move the visor to the uppermost or retracted position within the space 19, the slider may be pushed upwardly until the block 61 engages the cover 13 at the upper end of the slot 45, the upper tooth 69 of the spring element 67 then engaging the upper sloping side of a tooth 72 so as to hold the slider in this abutting relation and against movement upwardly or downwardly along the slot to hold the visor securely in the retracted position.

In order to effect the movements of the visor between its shielding and retracted positions, and to hold it in either position, a connection is provided between the slider 55 and the visor 25. The head 56 of the slider is threaded at 73 to receive a threaded stud 75 having a head 76 provided with a screw driver slot 77 for screwing the stud 75 into the head 56 of the slider. The stud 75 extends through a hole 79 provided in the block 61 and is of such length as to extend also through an opening 81 in the visor, as shown in FIG. 3, slight clearance being provided between the stud 75 and the hole 81 for easy engagement of the stud with the visor 25. It will be understood, when the slider is moved along the slot 45, that the visor 25 mounted on the track means 23, as above described, also will be moved along this track means to and from the retracted position of the visor within the space 19. When the stud 75 is unscrewed from the head 56 of the slider, the visor may be withdrawn from the space 19 by movement thereof along the track downwardly without removing the cover 13 from the helmet. This is made possible by the circular arc of the track means along the zone circle as described.

It also will be noted that at the outer side of the cover 13 a slideway or wear strip 85 (see FIG. 7) is disposed which may of a wear resisting material, such as nylon, and provides a bearing surface for the under side of the head 56 of the slider. The vertical height of the block 61 between the flanges 65 and the head 56 may be made such as to take into account the thickness of the strip 85, so that the required spring action of the element 67 will be secured, as above described, particularly the biased camming action of the teeth 69 into the depressions 59 between the teeth 57 of the strip 47. The slideway strip 85 of nylon may be secured to the cover by a suitable adhesive and covers the rivets 51 so as to provide a smooth bearing surface for the slider.

If desired the edge covering strip 5 at the portion 87 thereof which extends beneath the visor 25, FIG. 3, may be dimensioned and disposed so as to come into more or less frictional engagement with the under side of the visor in order to assist in preventing flutter of the visor and in some cases to afford resistance to movement of the visor upwardly or downwardly. Where such action is not desired, the edge covering strip 5 may be disposed in spaced relation to the visor as shown in FIG. 10.

At the lower end of the track means 23 in FIGS. 3 and 5 is shown a resilient element or spring clip 91 which has a part 92 disposed upon the surface of the base portion 29 between the cover 13 and this base portion. The element 91 has an upwardly extending finger 93 joined to the part 92 by a slightly reverted connecting part 94 at the edge of the base portion 29 adjacent the groove 27. The element 91 has a flange 95 extending upon the outer face of the base portion 29. The end of the finger 93 may be bent outwardly with respect to the track means. A shallow recess is provided in the under side of the cover for receiving this end of the finger 93. The finger 93 is disposed so that the wear strip 41 carried by the visor may come into engagement with the flat surface of the finger 93 when the visor is moved downwardly from the retracted position within the space 19. In the embodiment as shown in FIG. 3 the element 91 is disposed so as to be held by the lowermost screw 31 which secures the cover to the body portion 29 of the track means. The wear strip 41 may begin to engage the finger 93, as in FIG. 5, before the slider 55 reaches the position shown in FIG. 3 and, as it is moved toward the lowermost position in FIG. 3 to dispose the visor in the lowermost or eye-shielding position, the strip 41 passes under the finger 93 which thus binds the edge of the visor to the track means. An element 91 is provided at each side of the helmet and fluttering of the visor thus is prevented in the eye-shielding position and in the position thereof adjacent the eye-shielding position. If desired, additional flutter preventing elements similar to those at 91 may be attached at other locations along the track means 23.

In FIGS. 10 to 15, inclusive, is shown a modification of the device of the invention in which the detent means is disposed outwardly of the cover 13. In these figures the parts which are identical carry the same reference numerals as those of FIGS. 1 to 9, inclusive.

In this embodiment a strip 101 is provided with a slot 102 extending lengthwise thereof similarly to the slot 49 of FIG. 6 and matching the slot 45 in the cover 13. The strip 101 in the portions thereof at either side of the slot 102 is formed with corrugations of sinusoidal contour providing teeth 103 similar to the teeth 57 of FIG. 3 and forming therebetween depressions 105. The strip 101 may be made of any suitable material, for example, a metal capable of holding the corrugated form to provide the teeth 103 in the depressions 105.

In the embodiments of FIGS. 10 to 15 the slider 106 provides a head 107 having a rectangular recess 109 in its under side and extending parallel to the length of the slot 102. This recess 109 receives a rectangular portion 111 of a block 113 (FIG. 14) provided with laterally extending flanges 115 disposed at the inner side of the cover 13 and in sliding engagement with the inner surfaces thereof.

The head 107 also is provided with another recess 117 in its under side, wider and shallower than recess 109. The recess 117 receives a spring element 119 similar to the spring element 67 of FIGS. 3 to 9, inclusive. The spring element 119 is provided with a rectangular opening 121 into which the rectangular portion 111 of the block 113 enters with clearance, so that the spring element 119 becomes disposed between the inner surface of the recess 117 and the strip 101. The spring element 119, similarly to that of FIG. 9, provides prominences or teeth 123 which extend inwardly toward the visor in FIGS. 10 and 13 for engagement with the teeth 103 and the depressions 105 therebetween of the strip 101.

As shown in FIG. 10 the teeth 103 are equally spaced along the strip 101 and the two sets of teeth, each consisting of four teeth and three depressions therebetween, are in spaced relation to each other along the strip. Similarly to the arrangement of FIG. 3 the spring element 119 in FIG. 10 is of such length that in the position shown the lower tooth 123 bears on the lower sloping surface of the lowermost tooth 103 while the upper tooth 123 of the spring element also bears on the lower sloping surface of the corresponding tooth of the upper set of teeth. In the position shown the slider 106 is disposed in the lowermost position with the end of the block 113 nearly abutting the wall of cover 13 at the lower end of the slot 45. The slider 106, therefore, is securely held in place against movement in either direction.

For holding the block 113 securely in position with respect to the head 107, screws 125 are provided passing through holes in the head 107 and threaded into holes 127 in the block 113. The flanges 115 extend laterally from the block 113 at either side of the slot 45 in the cover 13 for bearing engagement with the under side of the cover under the bias provided by the spring element 119 which biases the head 107 outwardly.

As in the embodiment of FIGS. 3 to 9, inclusive, the prominences or teeth 123 may be cammed outwardly when the slider 106 is pushed along the slot 45 in either direction and the camming surfaces of the teeth 123 with respect to the teeth 103 serve to cam the teeth into the depressions 105 between the teeth. The strength of the spring element 119 in this embodiment also is such as to resist the movement of the teeth 123 out of the depressions 105 but such that the slider may be pushed manually along the slot 45 concomitantly with the camming action as described, the slider being securely held in any one of the positions attained by the teeth 123.

The portion of the strip 101 between the upper set of teeth 103 and the upper end of the strip 101 is not provided with teeth and follows the curve of the cover to a single tooth 131 adjacent the upper end of the slot into engagement with which the upper tooth 123 of the spring element 119 may move and may be cammed over the tooth 131. The block 113 then abuts the cover at the end of slot 45 and the slider 106 is held in the uppermost position with the visor 25 disposed in the retracted position within the space 19 between the helmet 1 and the cover 13. The strip 101 may be held in place on the cover 13 by means of rivets 133.

In order to connect the slider 106 to the visor 25, the head 107 is provided with a central bore 135 through which a stud 137 passes, this stud also passing through a corresponding hole 139 in the block 113. At the end of the stud 137 disposed within the space 19 and at the opposite side of the visor 25 from the block 113 the stud carries a pin 141 extending transversely thereof. In order to provide for disposing the pin 141 in the position shown, the block 113 is provided with a slot 143 extending lengthwise of the block transversely of the hole 139 and of the stud 137. It will be understood that pin 141 may be inserted in the slot 143 when the stud 137 is inserted in the hole 135 and moved axially through the hole 139. As shown in FIG. 11, the visor 25 also is provided with a hole 145 of sufficient size to receive the stud 137 with slight clearance and is provided also with a slot 147 which extends lengthwise of the slot 45 in the cover 13, so that the pin 141 may be passed through the slot 147 to a position beneath the visor 25. The stud 137 is rotatable in the hole 139 and the pin 141 thus may be rotated to the position transversely of the slots, as shown in FIG. 11, when the pin reaches the under side of the visor 25 as shown in FIGS. 10, 12 and 13. The stud 137 is provided with a head 149 which in the position shown in FIG. 13 is brought into engagement with the upper surface of the head 107 of the slider, the head 149 being secured in this position by a screw 151 threaded in a hole 153 suitably disposed in the head 107 to fix the position of the pin 141 transversely of the slots to prevent disengagement of the stud 137 from the visor 25.

In FIGS. 15 and 16 is shown a modification of the means for preventing disengagement of the stud from the visor. In this embodiment the slider 106, which may be of the same form as that shown in FIG. 10 as to engagement of the teeth 123 of the spring element 119 with teeth 103 and depressions 105 therebtween, carries a hollow stud 161 which is threaded at its end to receive a plug 163, a spring 165 being disposed within the hollow space and bearing against a head 167 carried at the inner end of a shank 169 passing through a bore 171 in the plug 163. At the opposite end of the hollow stud 161 it is provided with a head 149 having a countersunk hole 164 for receiving a screw to secure the head 149 to the head 107 of the slider as in FIG. 12.

The end of the shank 161 extends outwardly beyond the end of the stud 161 toward and may engage the outer surface of the shell 1, or, as shown in FIG. 15, the end of the shank may be slightly spaced from this outer surface. If, due to variations in the surface of the shell 1, the shank 169 comes into engagement with the surface of the shell as the slider is moved along the slot in the cover, the shank will be forced inwardly of the stud 161 against the bias of the spring 165. When the pressure of the shell on the shank 169 is relieved, the shank will move outwardly until the head 167 engages the plug 163. The parts are so dimensioned that, regardless of any movement of the visor 25 relative to the stud 161 lengthwise of the stud because of flutter or other conditions, the shank 169 always will be close enough to the surface of the shell or at its end will engage the shell 1 so as to provide an interference element which will interfere with the visor to prevent it from passing between the end of the shank 169 and the shell. The visor, therefore, cannot become released from the slider which is always effective to move the slider inwardly and outwardly of the recess 19 even under disadvantageous conditions due to high velocity or other aerodynamic conditions.

The invention will find application to helmets of different constructions which provide a rigid shell and are made of material capable of supporting and of having secured thereto the track means and the cover and capable of otherwise cooperating with the parts as described for supporting the cover and the slider mounted thereon. The cover itself also may be made of different materials while providing a rigid structure engaging the shell surface and suitable for supporting the detent means and the slider carrying the detent engaging means for holding the slider in predetermined positions along the slot.

Modifications of the form of the cover and of the teeth and other parts of the detent means and the detent engaging means, as well as of the slider and the parts carried thereby for securing the desired engagement of the detent engaging means with the detent means, may be made which will secure the features of the invention which provide for camming action of the detent engaging means, the mounting of the cover, the provisions for assembly and disassembly of the slider, the detent engaging means and the visor, without departing from the scope of the invention as defined in the appended claims.

I claim:

1. In a protective helmet having a rigid shell dimensioned to receive the head of a wearer, a cover secured to the forward portion of the shell in outwardly spaced relation thereto to form with said shell a visor receiving space, a visor, and means carried by said shell for supporting said visor for movement thereof between a retracted position within said space and a position of said visor shielding the wearer's eyes, said cover being provided with a slot extending generally upwardly and rearwardly from an end thereof adjacent the lower edge of said cover, the combination with said cover and said visor, of a slider supported by said cover for movement thereof along said slot, said slider having a portion extending through said slot into said visor receiving space and engaging said visor for effecting concomitantly with said movement of said slider along said slot movement of said visor into and out of said space to and from said retracted position of said visor, detent means fixedly supported by said cover adjacent said slot at a predetermined position therealong and providing a cam surface extending in the direction along said slot, detent engaging means carried by said slider for movement therewith and providing a camming surface for engaging said cam surface of said detent means, and means biasing said detent engaging means toward said detent means for engagement of its camming surface with said cam surface of said detent means, said detent engaging means at said predetermined position of said slider being cammed into holding engagement with said detent means and being cammed out of said holding position by engagement of said camming surface with said cam surface upon movement of said detent engaging means with said slider along said slot from said predetermined position to effect said movement of said visor.

2. In a protective helmet the combination as defined in claim 1 which comprises means providing a slideway extending from said detent means along said slot of said cover, said biasing means biasing said detent engaging means into sliding engagement thereof with said slideway in said movement of said slider along said slot.

3. In a protective helmet the combination as defined in claim 1 in which said detent means is disposed at the inner surface of said cover within said visor receiving space, said slider comprising a flange extending transversely of said slot within said visor receiving space and disposed adjacent the inner surface of said cover for preventing movement out of said slot of said portion of said slider which extends through said slot, said detent engaging means comprising an element carried by said slider and retained by said flange adjacent said inner surface of said cover and biased by said biasing means into engagement with said detent means at said predetermined position of said slider, said element providing said camming surface of said detent engaging means.

4. In a protective helmet the combination as defined in claim 1 in which said detent means is disposed at the outer surface of said cover, said slider comprising a flange extending transversely of the slot within said visor receiving space and disposed adjacent the inner surface of said cover for preventing movement out of said slot of said portion of said slider which extends through said slot, said detent engaging means comprising an element carried by said slider and disposed between a part of said slider and said outer surface of said cover and biased by said biasing means into engagement with said detent means at said predetermined position of said slider, said element providing said camming surface of said detent engaging means.

5. In a protective helmet the combination as defined in claim 1 in which said portion of said slider engaging said visor comprises a stud extending through an opening in said visor, said stud being provided with a pin disposed transversely of said stud at the opposite side of said visor from said slider for preventing movement of said stud out of said opening in said visor.

6. In a protective helmet the combination as defined in claim 5 in which said slider is provided with a bore therein for receiving said stud and with a slot extending transversely of said bore for passage of said pin therethrough, said stud being rotatable in said bore with respect to said slider between positions respectively disposing said pin in line with and transversely of said slot of said slider, said stud and said pin being insertable from the outer side of said slider through said bore and said slot of said slider, said visor being correspondingly slotted adjacent said opening therethrough to provide for passage of said pin therethrough and so as to be engaged by said pin at the face of said visor disposed toward said shell upon rotation of said stud.

7. In a protective helmet the combination as defined in claim 6, which comprises means for fixing said stud and said pin in the position to which they are rotated.

8. In a protective helmet the combination as defined in claim 1 in which said portion of said slider engaging said visor comprises a stud extending through an opening in said visor, an interference element supported by said stud within said visor receiving space and extending from the inner end of said stud to an end of said element adjacent said shell, said element being supported for movement thereof relative to said stud toward and away from the exterior surface of said shell, and means carried by said stud and engaging said interference element to bias said element toward said surface of said shell while providing for movement of said element against said bias upon engagement of said element with said shell during movement of said slider along said slot of said cover concomitantly with movement of said visor into and out of said visor receiving space.

9. In a protective helmet the combination as defined in claim 1 in which said detent means provides a plurality of teeth disposed in a series along said slot adjacent said predetermined position of said detent means and providing said cam surface, said detent engaging means comprising a spring element carried by said slider and biased into engagement with said teeth in succession for holding said visor in a plurality of predetermined positions with respect to said shell, said element providing said camming surface of said detent engaging means.

10. In a protective helmet the combination as defined in claim 9 in which said series is disposed in a location adjacent the lower end of said slot.

11. In a protective helmet the combination as defined in claim 1 in which said detent means comprises at least one tooth disposed adjacent the upper end of the slot for retaining said visor in said retracted position.

12. In a protective helmet the combination as defined in claim 1 in which said detent means provides a plurality of sets of teeth, said sets each comprising a plurality of teeth disposed in predetermined spaced relation along said slot and providing said cam surface, said sets of teeth being disposed in spaced relation along said slot in predetermined locations, said detent engaging means comprising an element carried by said slider and having prominences disposed with respect to said slider in spaced relation along said slot, the spacing of said prominences being substantially the same as the spacing along said slot between corresponding teeth in two of said sets of teeth, said prominences providing said camming surface and being biased by said biasing means into engagement with said detent means for holding said visor in a plurality of predetermined positions with respect to said shell.

13. In a protective helmet having a rigid shell dimensioned to receive the head of a wearer, a visor, and a cover secured to the forward portion of said shell in outwardly spaced relation thereto to form with said shell a visor receiving space, the combination with said shell and said cover, of track means supported on the outer surface of said shell with the length of said track extending generally upwardly and rearwardly with respect to the forward edge of the helmet, said track means providing a lengthwise groove open in the direction outwardly transversely of said outer surface of said shell, said track means providing a body portion extending outwardly from said surface of said shell and defining a rearwardly disposed wall of said groove transverse to said outer surface of said shell, said body portion providing an outer surface extending along said track means generally parallel to said outer surface of sail shell, the lateral edge portion of said cover extending generally upwardly and rearwardly along the shell surface, said lateral edge portion of said cover being secured to said body portion in engagement with said outer surface of said body portion, said visor along the lateral edge thereof adjacent said track means being provided with a bead disposed in said groove in sliding relation thereto and confined therein by said cover secured upon said outer surface of said body portion, said track means providing a second wall disposed forwardly of and in opposed relation to said body portion at the opposite side of said groove for sliding engagement therewith of said bead of said visor, said second wall extending outwardly from said outer surface of said shell to an edge surface thereof spaced from said cover to provide for movement of said visor between said edge surface and said cover to and from a retracted position of said visor in said visor receiving space concomitantly with movement of said bead along said groove, the spacing of said walls being sufficient to provide for movement of said bead out of said groove in the direction transverse to the shell surface.

14. In a protective helmet the combination as defined in claim 13 in which a resilient clip is disposed adjacent the lower end of said track means and engageable with said edge of said visor in the position of said visor outwardly disposed with respect to said retracted position for preventing movement of said edge relative to said track means to prevent fluttering of said visor.

15. In a protective helmet the combination as defined in claim 13 in which said visor is provided with a wear-resisting strip at the face thereof disposed toward said cover for sliding engagement with a surface fixed with respect to said cover in said movement of said visor.

References Cited in the file of this patent

UNITED STATES PATENTS

| | | |
|---|---|---|
| 2,601,149 | Jamison | June 17, 1952 |
| 2,620,672 | McMahon | Dec. 9, 1952 |
| 2,798,221 | Bailey et al. | July 9, 1957 |
| 2,813,271 | Finken | Nov. 19, 1957 |
| 2,815,508 | Finken | Dec. 10, 1957 |
| 2,867,812 | Roth et al. | Jan. 13, 1959 |

UNITED STATES PATENT OFFICE

CERTIFICATE OF CORRECTION

Patent No. 3,066,305                December 4, 1962

Jackson A. Aileo

It is hereby certified that error appears in the above numbered patent requiring correction and that the said Letters Patent should read as corrected below.

Column 4, line 10, for "through" read -- throughout --; column 6, line 40, after "may" insert -- be --; column 8, line 60, for "therebtween" read -- therebetween --; column 12, line 3, for "sail" read -- said --.

Signed and sealed this 27th day of August 1963.

(SEAL)
Attest:

ERNEST W. SWIDER
Attesting Officer

DAVID L. LADD
Commissioner of Patents